United States Patent
Smith et al.

(10) Patent No.: US 6,843,083 B2
(45) Date of Patent: Jan. 18, 2005

(54) LOCKABLE VALVE COVER

(75) Inventors: Mark R. Smith, Lakeside, CA (US);
Danny B. Green, Descanso, CA (US);
Leonard W. Byrd, Lakeside, CA (US);
George S. Anderson, Descanso, CA (US)

(73) Assignee: LMS, Inc., El Cajon, CA (US)

( * ) Notice: Subject to any disclaimer, the term of this patent is extended or adjusted under 35 U.S.C. 154(b) by 52 days.

(21) Appl. No.: 10/327,374

(22) Filed: Dec. 20, 2002

(65) Prior Publication Data

US 2004/0118170 A1 Jun. 24, 2004

(51) Int. Cl.[7] ............................................ F16K 35/00
(52) U.S. Cl. ............................ 70/178; 70/180; 137/385
(58) Field of Search ...................... 70/175–180, 22–26, 70/31–34; 137/385

(56) References Cited

U.S. PATENT DOCUMENTS

| | | | | | |
|---|---|---|---|---|---|
| 112,910 | A | * | 3/1871 | Essex ........................... | 70/180 |
| 748,720 | A | * | 1/1904 | Glazier ......................... | 70/178 |
| 812,021 | A | * | 2/1906 | Dahl ........................... | 70/180 |
| 1,003,211 | A | * | 9/1911 | Shepard ....................... | 70/178 |
| 1,104,022 | A | * | 7/1914 | Tuttle .......................... | 70/180 |
| 1,131,821 | A | * | 3/1915 | Campbell ................... | 137/382 |
| 1,215,958 | A | * | 2/1917 | Miller ......................... | 137/384 |
| 1,380,675 | A | * | 6/1921 | Myers .......................... | 70/178 |
| 1,668,223 | A | * | 5/1928 | Utman ........................ | 137/382 |
| 1,683,649 | A | * | 9/1928 | Belote ......................... | 70/180 |
| 1,903,581 | A | * | 4/1933 | Turner ......................... | 70/178 |
| 2,462,951 | A | * | 3/1949 | Thorpe ....................... | 220/725 |
| 2,623,380 | A | * | 12/1952 | Lee ............................. | 70/178 |
| 2,706,900 | A | * | 4/1955 | Albert ......................... | 70/178 |
| 3,156,256 | A | * | 11/1964 | Weaver ..................... | 137/385 |
| 4,630,456 | A | * | 12/1986 | Nielsen, Jr. ................. | 70/232 |
| 5,193,366 | A | * | 3/1993 | Brinkman ..................... | 70/18 |
| 6,092,402 | A | * | 7/2000 | Porcelli et al. ............... | 70/18 |
| 6,354,116 | B1 | * | 3/2002 | Drake ......................... | 70/178 |
| 6,718,804 | B1 | * | 4/2004 | Graves et al. ............... | 70/177 |

* cited by examiner

Primary Examiner—Suzanne Dino Barrett
(74) Attorney, Agent, or Firm—Gordon & Rees LLP

(57) ABSTRACT

A lockable valve cover has a housing with an open end and a pair of opposing slots on opposite sides of the housing extending from the open end for engaging over spaced locations on a pipe on opposite sides of a valve over which the housing is placed, the pipe extending in a first direction through the slots. A pair of openings on opposite sides of the housing are aligned in a second direction perpendicular to the first direction with a first opening being larger than a second opening, and a locking plate having a reduced width tongue engages across the housing through the openings, with the tongue projecting through the second opening. A padlock engages a hole in the tongue to lock the housing in place.

8 Claims, 1 Drawing Sheet

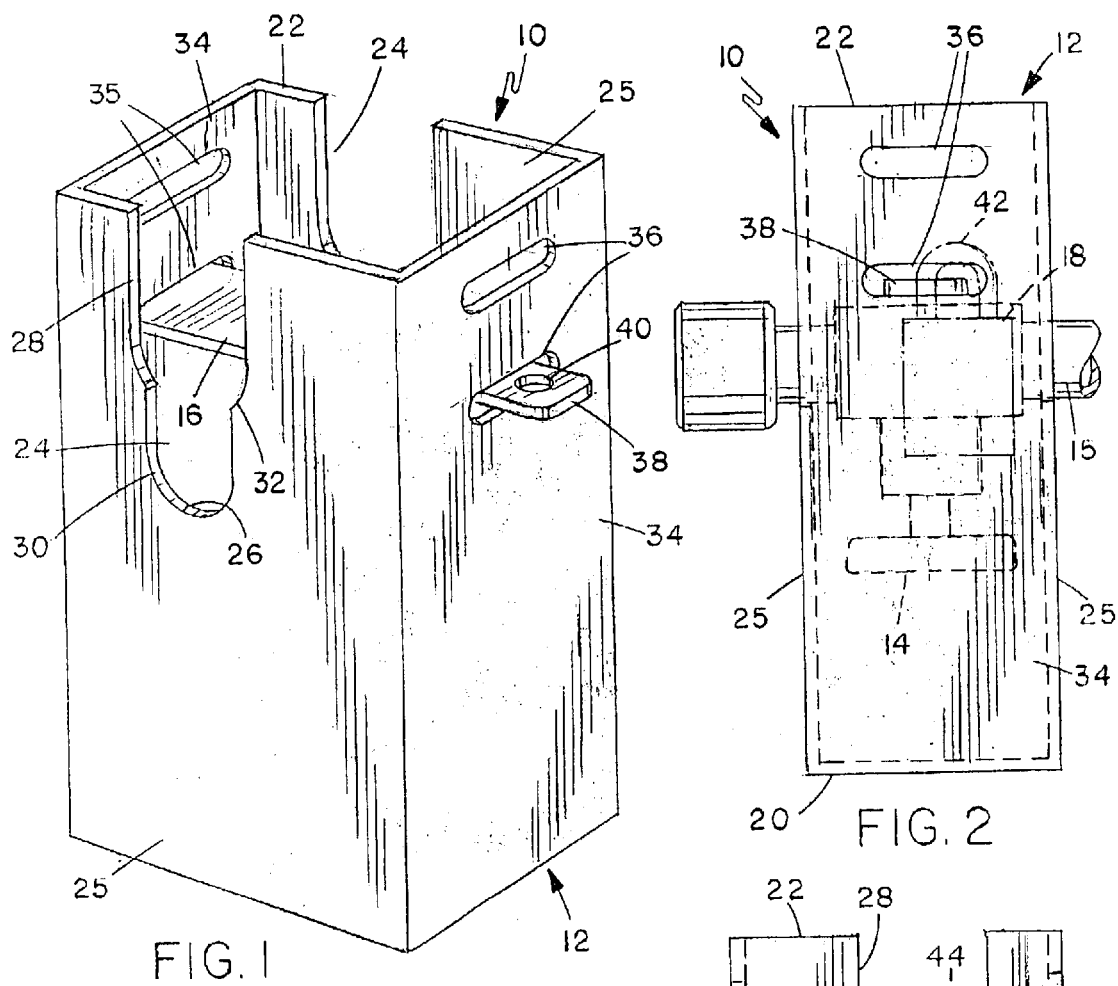
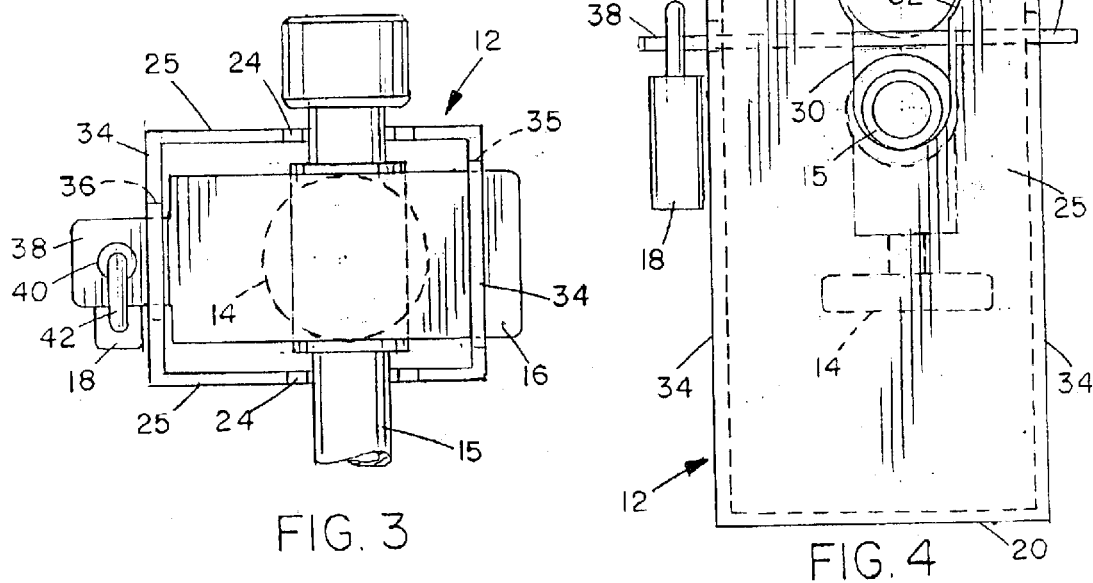

LOCKABLE VALVE COVER

BACKGROUND OF THE INVENTION

The present invention relates to a valve cover device for a valve controlling flow of fluid through a pipe, for preventing unauthorized tampering with the valve.

Valve locking devices have been proposed in the past for use on gas or water valves, for example, to prevent unauthorized individuals from turning the gas or water on or off. There is a particular need for such devices on construction sites, since people may turn on water or gas valves before the plumbing or gas operated fixtures in the building are properly connected. This may cause water damage or risk of explosion.

U.S. Pat. No. 6,354,116 of Drake describes a valve cover apparatus having a housing with one closed end and one open end, the open end being placed over a valve and the pipe junction to which the valve is connected. A slot extends from the open end of the housing for engaging over the pipe on each side of the valve. A hook engages under the pipe and open end of the housing, and has a connected stem extending up into the housing and into a lock to secure the hook in position unless released by a key. In U.S. Pat. No. 2,623,380 of Lee, a cylindrical housing extends over the valve and has opposing, vertically extending slots which engage over the pipe on each side of the valve. A locking pin extends through aligned holes in the housing beneath the pipe, and is secured by a padlock at its free end.

SUMMARY OF THE INVENTION

It is an object of the present invention to provide a new and improved lockable valve cover apparatus for a valve controlling flow of fluid in a pipe.

According to the present invention, a lockable valve cover apparatus is provided, which comprises a housing having a closed first end and an open second end, a pair of aligned, opposing slots on opposite sides of the housing extending from the open second end of the housing for engaging over spaced locations on a pipe system on opposite sides of a valve over which the housing is placed, the slots being aligned in a first direction, and at least two aligned openings spaced from the open end of the housing on opposite sides of the housing, the openings being aligned in a direction transverse to the first direction, a first one of the openings being of larger dimensions than a second one of the openings, and a closure member for engagement through the aligned openings, the closure member having a first end and a second end, the second end being insertable through said first and second openings and extending outwardly from said second opening, a first portion of the closure member extending from said first end being of larger dimensions for engagement through said first opening, and a second portion or tongue of the closure member extending from said first portion being of smaller dimensions than said first portion for engaging through said second opening, the closure member having a lock opening adjacent said second end, and a locking member for engaging through said lock opening to lock the closure member in position whereby the housing is locked over the pipe valve.

In an exemplary embodiment of the invention, the closure member is a flat plate having a first portion which is wider than the second portion, and the first and second openings are both elongate slots. The locking member may be a padlock having a hasp for extending through the lock opening. The opposing slots extending from the open end of the housing may have a first end portion of a first width and a second end portion of a second width less than the first width. A first set of openings are provided adjacent the open end of the housing, and a second set of openings are provided at or adjacent the second end portion of the slots. This permits the housing to be positioned over pipes of different diameters, with smaller diameter pipes engaging in the smaller width second portion of the slots, and the locking or closure plate engaged through the second set of openings. If the valve to be locked is on a larger diameter pipe, the pipe engages in the first, larger width portion of the slots, and the closure plate is extended through the first set of openings.

The housing may be of any suitable shape, such as cylindrical or rectangular, and is of suitable high strength material such as steel. The smaller dimensions of the second opening and the second end portion of the closure member will prevent the closure member from being pushed all the way through the two openings, so that the closure member cannot be removed from the housing when the locking device or padlock is engaged. Thus, when the housing is locked in place over the valve, the valve cannot be tampered with or moved from a closed to an open position, and the only person or people who can unlock or remove the closure apparatus are those who have a key to unlock the locking device.

The lockable valve closure of this invention may be used, for example, to restrict access to a water or gas valve at a construction site until the water and gas fixtures in a building have been hooked up and construction is complete. This will reduce or avoid the risk of water damage as a result of someone deliberately or accidentally turning on a water valve before construction is complete, as well as the risk of gas leaking from an unconnected pipe if a gas valve is inadvertently turned on before the gas pipe is properly connected. The apparatus is simple, inexpensive, and easy to use, and such an apparatus may be used to secure each valve at a construction site.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 1 is a perspective view of the lockable valve cover, according to an exemplary embodiment of the invention;

FIG. 2 is a right-hand side view with a valve shown in locked position;

FIG. 3 is a top plan view thereof; and

FIG. 4 is a rear view thereof.

DETAILED DESCRIPTION OF THE DRAWINGS

FIGS. 1 to 4 illustrate a lockable valve cover apparatus 10 according to an exemplary embodiment of the invention. The apparatus 10 basically comprises a housing 12 for placing over a valve 14 which controls flow of fluid in a pipe 15, a lock plate or closure member 16 for holding the housing over the valve, and a locking device 18 such as a padlock for locking the closure member 16 in position.

The housing 12 is of generally square or rectangular cross section, although it may be of cylindrical or other alternative shapes, and has a closed end 20 and an open end 22. A pair of opposite, aligned slots 24 extend from the open end 22 of the housing on opposite side walls 25 of the housing towards the closed end of the housing. Each slot 24 has an open end at the open end of the housing, a closed, rounded end 26, a first end portion 28 of a first width extending from the open end, and a second portion 30 of a second width less than the first width extending up to the closed end 26 of the housing. The first portion 28 also has a rounded end or shoulder 32 at the junction between the first and second, different width portions of the slot. The different width portions 30, 28 of the slot are provided for engaging over different diameter pipes, as discussed in more detail below, for example pipes of 1 inch and 1.25 inch diameter. In this case, the widths of the slot portions 28, 30 may be of the order of 1-⅝" and 1-⅜" respectively. Further slot portions of varying widths may also be provided if necessary, or housings with different width slot portions for larger diameter pipes may be provided for alternative applications.

First and second pairs of aligned, slit-like openings are provided in the other two opposite side walls 34 of the housing, each pair having a first opening 35 of a first width and a second, aligned opening 36 in the opposite side wall which is of reduced width, as best illustrated in FIGS. 1 and 3. The first pair of openings is provided adjacent the open end 22 of the housing, while the second pair is spaced from the first pair as best indicated in FIGS. 1 and 4.

The lock plate or closure member 16 is best illustrated in FIGS. 1 and 3, and is of metal plate material such as steel. Lock plate 16 is of generally rectangular shape and of a uniform, first width along the majority of its length, but has a tongue 38 of a second, reduced width projecting from one end. A hole 40 is provided in the tongue 38, which is designed to receive the shackle 42 of padlock 18, as indicated in FIGS. 3 and 4. The first width of plate 16 is slightly less than the width of the first slit-like openings 35, while the tongue 38 is of a width slightly less than that of the second openings 36, so that it can extend through a second opening while the remainder of the plate is stopped against the inside of wall 34, as best illustrated in FIG. 3.

In order to lock a valve 14 in an open or closed position, the open end 22 of the housing is first placed over the valve with the opposing slots 24 engaging over the pipe 15 on each side of the valve T-junction, as indicated in FIGS. 2 to 4. FIG. 4 illustrates a smaller diameter pipe 15 which fits into the smaller width portion 30 of each slot in solid outline, while a larger diameter pipe 44 which would engage the larger width portion 28 is illustrated in dotted outline. The housing is urged downwardly until the pipes are seated against the rounded ends 26 of the slots, as indicated. At this point, the lock plate 16 is engaged across the housing over the other side of the pipe 15, by engaging it through the second set of aligned openings. Plate 15 is inserted first through the larger width opening 35 and then pushed through the housing until the tongue 38 extends through the aligned, smaller width opening 36 and projects out of the opposite side of the housing. In this position, one end of the plate will still project outwardly from opening 35, since the length of the plate is greater than the width of the housing between the outer faces of the sides 34. The shackle 42 of the padlock 18 is then engaged through opening 40 in the tongue, and the padlock is locked. This locks the plate in position until the padlock is released. The lock plate 16 will therefore prevent removal of the housing, such that unauthorized access to the valve 14 is prevented.

If the apparatus is to be used on a valve located on a pipe of diameter larger than the width of the slot portions 30, such as the pipe 44 illustrated in dotted outline in FIG. 4, the pipe will first be seated at the junction 32 between the wider portion 28 and the narrower portion 30 of each slot, and the lock plate 16 will then be engaged through the upper two openings 35, 36, closer to the open end 22 of the housing. If necessary, more than two different width slot sections may be provided, so that the housing can be seated over larger pipes.

The housing 12 is made of suitably strong material such as steel so as to reduce the risk of damage or removal without releasing the padlock. It will be understood that any suitable locking device may be used to hold the plate in the housing. The valve cover apparatus of this invention is particularly intended for use on valves on utility pipes such as gas or water pipes, in order to prevent unauthorized individuals from turning the gas or water on and off. It may be used in an existing residential or business building, but is particularly useful for construction sites. It has been found that people will turn on the gas or water valves at such sites before the associated fixtures are properly connected, causing water damage or the like. The lockable valve cover of this invention will reduce the risk of such damage by restricting or preventing access to the valves. The cover is simple, inexpensive and easy to use, as well as being adaptable for different diameter pipes.

Although an exemplary embodiment of the invention has been described above by way of example only, it will be understood by those skilled in the field that modifications may be made to the disclosed embodiment without departing from the scope of the invention, which is defined by the appended claims.

We claim:

1. A lockable valve cover apparatus, comprising:
   a housing having a closed first end and an open second end, and a pair of opposing slots on opposite sides of the housing extending from the open second end of the housing for engaging over spaced locations on a pipe on opposite sides of a valve over which the housing is placed, the pipe extending in a first direction through the slots;
   the housing having at least two aligned openings spaced from the open end of the housing on opposite sides of the housing, the openings being aligned in a second direction transverse to the first direction, a first one of the openings being of larger dimensions than a second one of the openings;
   a closure member for engagement through the aligned openings, the closure member having a first portion and a tongue of reduced dimensions extending from the first portion, the tongue having dimensions less than the dimensions of said second opening and the first portion having dimensions greater than the dimensions of the second opening and less then the dimensions of the first opening, whereby the closure member may be inserted in said second direction transversely through said housing via said first and second openings with the tongue projecting through said second opening so as to hold the valve cover on a pipe engaging in said slots;
   the tongue of the closure member having a lock opening; and
   a locking member for engaging through said lock opening to lock the closure member in position whereby the housing is locked over the pipe valve.

2. The apparatus as claimed in claim 1, wherein the closure member is a flat plate having a first portion which is wider than the tongue, and the first and second openings are both elongate slots.

3. The apparatus as claimed in claim 1, wherein the locking member is a padlock having a hasp for extending through the lock opening.

4. The apparatus as claimed in claim 1, wherein the opposing slots extending from the open end of the housing each have a first open end at the open end of the housing and a second, closed end, each slot having a first end portion of a first width extending from said first end and a second end portion of a second width less than the first width extending from said first end portion to said second end.

5. The apparatus as claimed in claim 4, wherein said aligned openings comprise a first set of aligned openings located adjacent the open end of the housing, and a second set of identical aligned openings are located at a position spaced from said first set and adjacent a junction between said first and second end portions of said slots, whereby a first pipe of a smaller diameter may be locked in the second portion of each slot with said closure member engaging through said second set of openings and a second pipe of a larger diameter may be locked in the first portion of each slot with said closure member engaging through said first set of openings.

6. The apparatus as claimed in claim 1, wherein the housing is of rectangular cross-section having a first pair of opposite, parallel side walls, and a second pair of opposite side walls perpendicular to said first pair, the slots being located in said first pair of side walls and the openings being located in said second pair of side walls.

7. The apparatus as claimed in claim 4, wherein the first and second end portions of each slot are of predetermined dimensions for fitting over pipes of 1-¼ inches and 1 inch diameter, respectively.

8. A lockable valve cover apparatus, comprising:

a housing having a closed first end, and an open second end and a pair of opposing slots on opposite sides of the housing extending from the open second end of the housing for engaging over spaced locations on a pipe on opposite sides of a valve over which the housing is placed, the pipe extending in a first direction through the slots;

each slot having at least two different portions of different widths for engaging over pipes of different diameters, each slot having a first portion of a first width extending from said first end and a second portion of a second width less than the first width extending from the first end portion to the second end;

a locking member for engaging across the housing to lock a pipe in said slots, whereby the housing is locked over a valve on said pipe;

the housing having spaced, first and second pairs of aligned openings on opposite sides of the housing, each pair of openings being aligned in a direction transverse to said first direction, and said locking member engaging through a selected pair of aligned openings to hold said housing on a pipe;

each pair of aligned openings comprising first and second openings, the first opening being of larger dimensions than said second opening, the locking member having a first portion and a tongue of reduced dimensions extending from the first portion, the tongue having dimensions less than the dimensions of said second opening and the first portion having dimensions greater than the dimensions of the second opening and less than the dimensions of the first opening, whereby the locking member may be inserted in said second direction transversely through said housing via said first and second openings with the tongue projecting through said second opening so as to hold the valve cover on a pipe engaging in said slots; and the tongue of the closure member having a lock opening for receiving the hasp of a padlock.

* * * * *